US012019358B2

(12) United States Patent
Tsuyuki

(10) Patent No.: US 12,019,358 B2
(45) Date of Patent: Jun. 25, 2024

(54) ADJUSTMENT MEMBER FIXING DEVICE, PROJECTOR, AND ADJUSTMENT MEMBER FIXING METHOD

(71) Applicant: CASIO COMPUTER CO., LTD., Tokyo (JP)

(72) Inventor: Yasuhiro Tsuyuki, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/856,495

(22) Filed: Jul. 1, 2022

(65) Prior Publication Data
US 2023/0018072 A1 Jan. 19, 2023

(30) Foreign Application Priority Data

Jul. 16, 2021 (JP) .................................. 2021-117727
Jul. 16, 2021 (JP) .................................. 2021-117729

(51) Int. Cl.
G03B 21/14 (2006.01)

(52) U.S. Cl.
CPC .................................. G03B 21/142 (2013.01)

(58) Field of Classification Search
CPC ........ G03B 21/00; G03B 21/10; G03B 21/14; G03B 21/54; G03B 21/142; G03B 21/145; G02B 7/02; G02B 7/021; G02B 7/04; G02B 7/023; H04N 9/3141; H04N 9/3152; H04N 9/3158
See application file for complete search history.

(56) References Cited

U.S. PATENT DOCUMENTS

2003/0184877 A1* 10/2003 Kabe ...................... G02B 7/102
  359/691
2006/0251412 A1* 11/2006 Liu .......................... G02B 7/10
  396/72
2007/0133109 A1* 6/2007 Kuroki ................. G03B 21/142
  353/100

FOREIGN PATENT DOCUMENTS

| JP | 2004-163484 A | 6/2004 |
| JP | 2006-047986 A | 2/2006 |
| JP | 2007-240955 A | 9/2007 |
| JP | 2009-080438 A | 4/2009 |
| JP | 2011-154307 A | 8/2011 |
| JP | 2019-132940 A | 8/2019 |
| WO | 2013/121832 A1 | 8/2013 |

OTHER PUBLICATIONS

JPO; Application No. 2021-117727; Notice of Reason for Refusal dated Mar. 30, 2023.
JPO; Application No. 2021-117729; Notice of Reason for Refusal dated Mar. 30, 2023.

* cited by examiner

Primary Examiner — Sultan Chowdhury
(74) Attorney, Agent, or Firm — Fitch, Even, Tabin & Flannery LLP

(57) ABSTRACT

An adjustment member fixing device includes an adjustment member fixing unit having a first state in which the adjustment member fixing unit has a width smaller than a gap on a lens barrel side so as to be inserted into the gap and a second state in which the adjustment member fixing unit has a width substantially identical to the gap so as to fix a movable adjustment member provided on the lens barrel side.

17 Claims, 10 Drawing Sheets

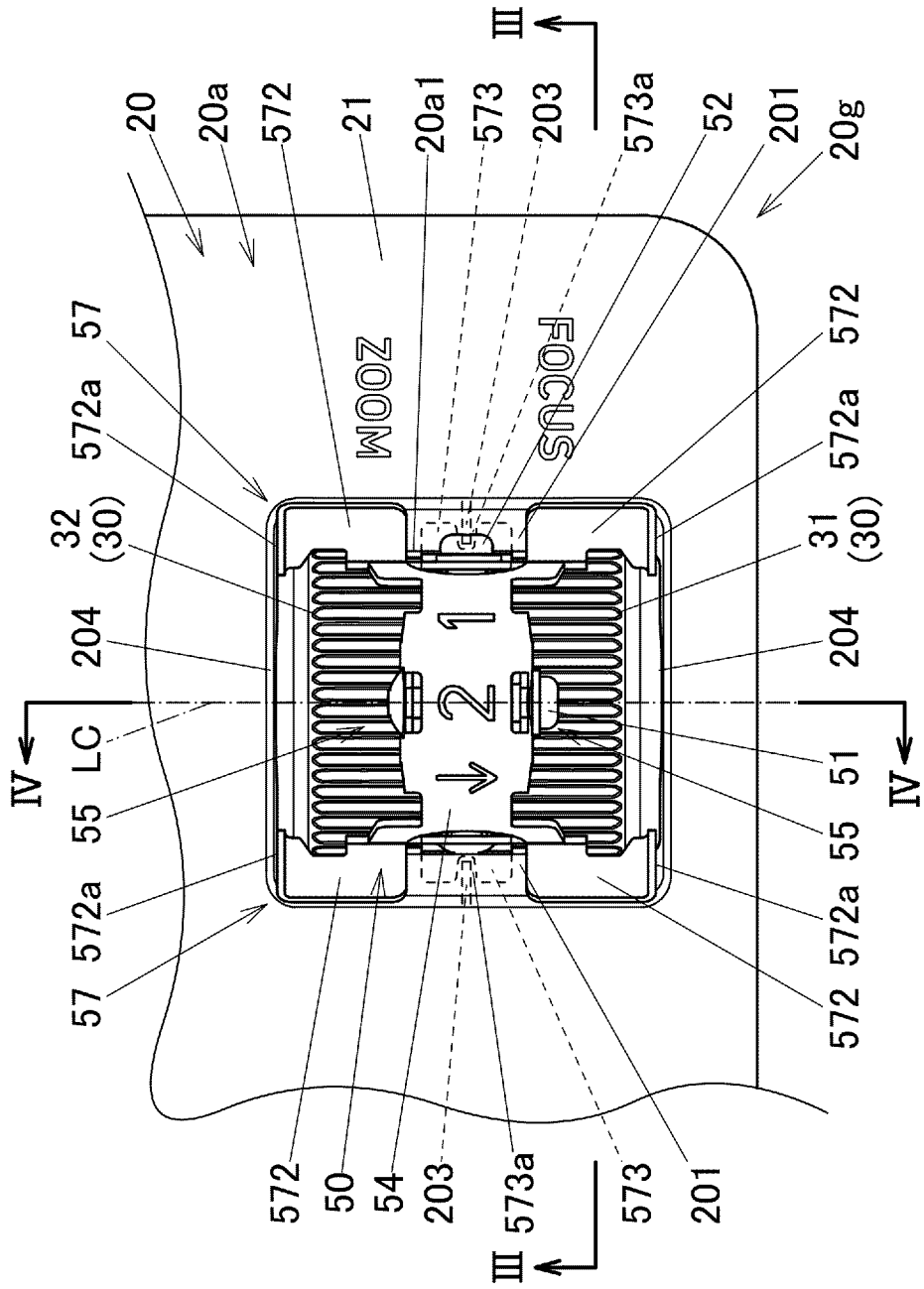

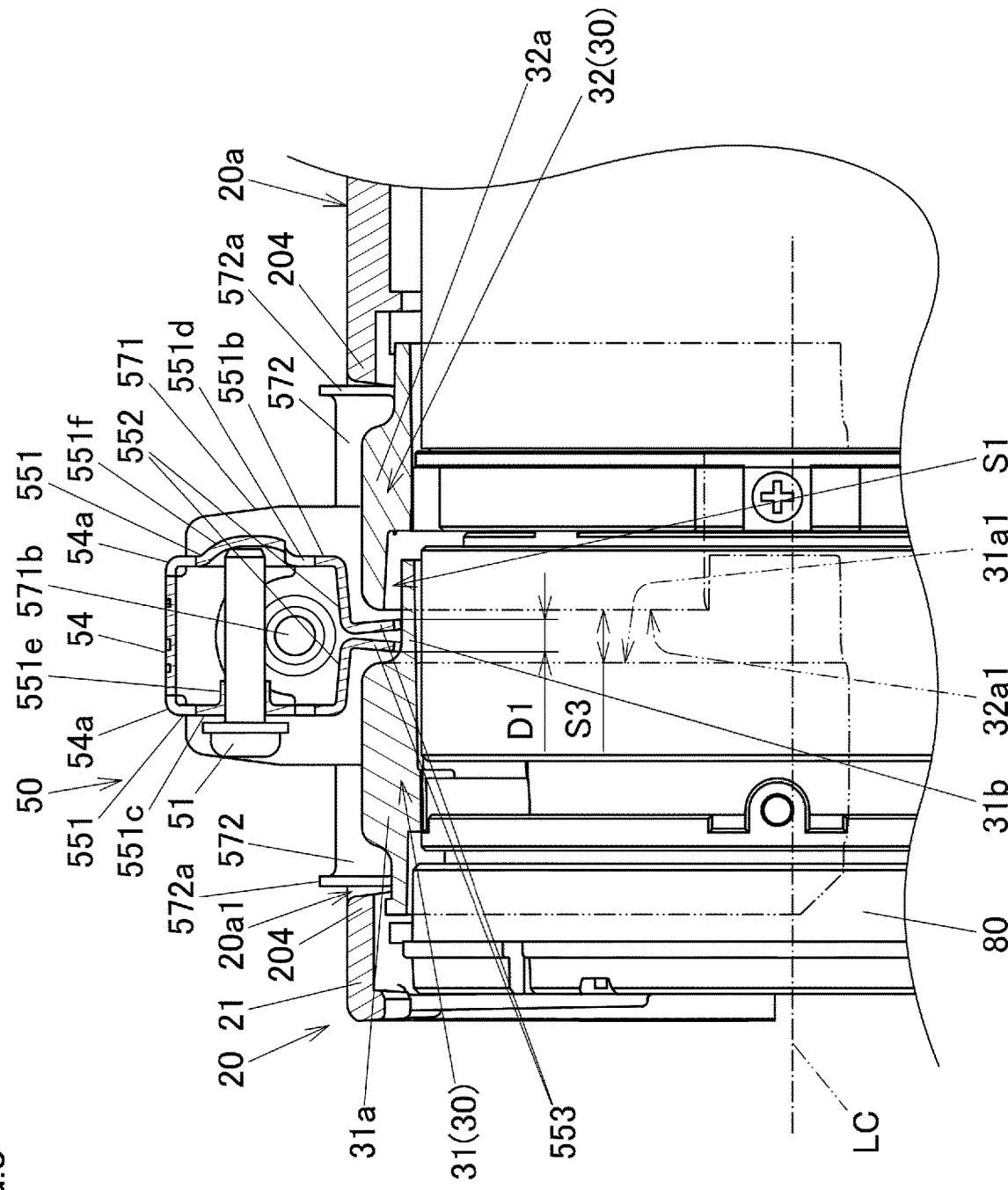

ADJUSTMENT MEMBER FIXING DEVICE, PROJECTOR, AND ADJUSTMENT MEMBER FIXING METHOD

CROSS-REFERENCE TO RELATED APPLICATIONS

This patent application is based upon and claims the benefit of priority under 35 USC 119 from Japanese Patent Application Nos. 2021-117727 filed on Jul. 16, 2021 and 2021-117729 filed on Jul. 16, 2021, the entire disclosure of which, including the specifications, claims, drawings and abstracts, is incorporated herein by reference in its entirety.

BACKGROUND OF THE INVENTION

Field of the Invention

The present disclosure relates to an adjustment member fixing device, a projector, and an adjustment member fixing method.

Description of the Related Art

There have conventionally been proposed adjustment member fixing devices for fixing an adjustment member such as an adjustment ring provided on a lens barrel for manually adjusting zooming or focusing. For example, International Publication No. 2013/121832 discloses an adjustment member fixing device in which a brake ring is provided on an outer circumference of an adjustment ring of a lens barrel of a monitoring camera, and a brake member is provided between the adjustment ring and the brake ring. The brake member is provided at a distal end of a lock knob which screws into an internal thread portion provided on an upper side of the brake ring. The lock knob is connected with the brake member via a projecting portion which projects from a barrel main body in such a manner as to be positioned on an inner side of the brake ring. When the lock knob is rotated in a tightening direction, the brake member is brought into abutment with the adjustment ring from above, while the brake ring is brought into abutment with the adjustment ring from below. In this way, the brake member and the brake ring are caused to move in opposite directions so as to hold the adjustment ring therebetween as a result of the rotation of the lock knob, whereby the adjustment ring is fixed in such a manner as not to be rotated relative to the barrel main body.

In the conventional adjustment member fixing device described above, the adjustment ring is pressed from an upper side and a lower side of the adjustment ring so as to be held in place. Here, in the event that a timing at which the adjustment ring is pressed from above does not coincide with a timing at which the adjustment ring is pressed from below, a force applied from above or below is first exerted on the lens barrel, whereby there may be a possibility that an optical axis of the lens barrel is shifted accordingly. In order to prevent the shifting of the optical axis of the lens barrel, the adjustment ring needs to be pressed from above and below at the same timing; however, in order to enable the adjustment ring to be so pressed at the same timing, components involved need to be worked and assembled together with high precision, which is impractical.

SUMMARY OF THE INVENTION

According to an aspect of the present disclosure, there is provided an adjustment member fixing device including an adjustment member fixing unit having a first state in which the adjustment member fixing unit has a width smaller than a gap on a lens barrel side so as to be inserted into the gap and a second state in which the adjustment member fixing unit has a width substantially identical to the gap so as to fix a movable adjustment member provided on the lens barrel side.

According to another aspect of the present disclosure, there is provided a projector including the adjustment member fixing device described above for attachment thereto.

According to a further aspect of the present disclosure, there is provided an adjustment member fixing method including inserting an adjustment member fixing unit of an adjustment member fixing device into a gap on a lens barrel side in the case that the adjustment member fixing unit is in a first state in which the adjustment member fixing unit has a width smaller than the gap, and putting the adjustment member fixing unit in a second state in which the adjustment member fixing unit has a width substantially identical to the gap in order to fix an adjustment member.

BRIEF DESCRIPTION OF THE DRAWINGS

FIG. 2 is an enlarged partial plan view of the projector to which the adjustment member fixing device according to the embodiment of the present disclosure is attached;

FIG. 8 is a sectional view corresponding to the section taken along the line IV-IV in FIG. 2 and also corresponding to FIG. 7B, showing the way in which the adjustment member fixing device according to the embodiment of the present disclosure is being attached to the projector;

DETAILED DESCRIPTION

Figure 1:
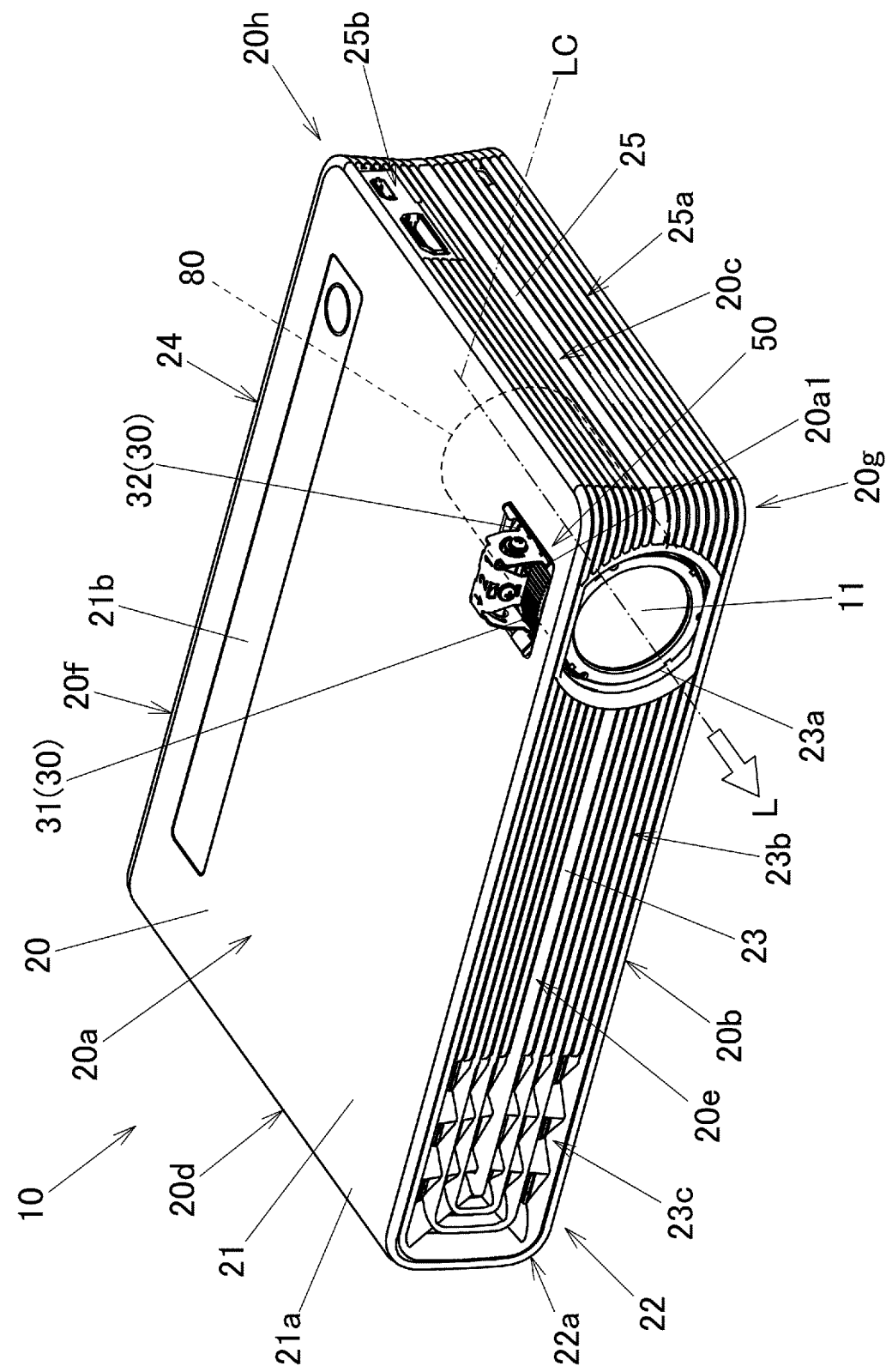
FIG. 1 is a perspective view showing an external appearance of a projector to which an adjustment member fixing device according to an embodiment of the present disclosure is attached.

Hereinafter, an embodiment of the present disclosure will be described. As shown in FIG. 1, a projector 10 includes a case 20 having six sides or surfaces (an upper surface 20a, a lower surface 20b, a left surface 20c, a right surface 20d, a front surface 20e, and a rear surface 20f) which are formed into a rectangular parallelepiped box-like shape which is long in a left-right direction thereof. The projector 10 has a projection port 11 in the front surface 20e. The projector 10 emits projected light L from the projection port 11. In the following description, the left and right of the projector 10 denotes a left-right direction of the projector 10 with respect to an emitting direction of the projected light L from the projection port 11, and the front and rear of the projector 10 denotes a front-rear direction of the projector 10 with respect to a traveling direction of the projected light L.

The case 20 has an upper case 21 including the upper surface 20a and a part of the right surface 20d and a lower case 22 including the lower surface 20b and a part of the right surface 20d. The case 20 has a front panel 23 on a front side, a rear panel 24 on a rear side, and a left panel 25 on a left side thereof. The front panel 23 extends to a left front corner portion 20g of the case 20, and the left front corner portion 20g is formed as a corner having a round shape. In addition, a projection port opening portion 23a of the projection port 11, air intake ports 23b, and air exhaust ports 23c are provided in the front panel 23. The rear panel 24 extends to a left rear corner portion 20h, and the left rear corner portion 20h is formed as a corner having a round shape. Although not shown, air intake ports and connection ports for image input/output connectors and the like are provided in the rear panel 24.

Edge portions 21a, 22a, which constitute connecting portions where the right surface 20d making up the upper case 21 and the lower case 22 of the case 20 connects to the upper surface 20a and the lower surface 20b, are each formed into a curved corner having a round shape. The other edge portions (for example, an edge portion formed by the upper surface 20a and the left surface 20c) of the case 20 other than the edge portions 21a, 22a are formed into a corner of a substantially right-angled shape. A power supply plug connection port, not shown, is provided in the right surface 20d of the lower case 22. Additionally, a control panel 21b is provided on the upper surface 20a of the upper case 21 for setting the projector 10 or the like.

As shown in FIGS. 1 and 2, a lens barrel 80, whose optical axis is defined as LC, is accommodated in the case 20 of the projector 10. Adjustment rings 30 (a focus adjustment ring 31 (a first adjustment member) and a zoom adjustment ring 32 (a second adjustment member)) are provided on the lens barrel 80 as movable adjustment members. The focus adjustment ring 31 and the zoom adjustment ring 32 are each provided about the optical axis LC into a semi-circular arc-shaped ring as viewed from the direction of the optical axis LC (refer to FIGS. 5 to 10), and for example, an outer circumference of a large-diameter portion 31a, with which the fingers of the hand of an operator are brought into contact for operation, is knurled. As shown in FIG. 6 and the like, a small-diameter portion 31b of the focus adjustment ring 31, which is located rearwards of the large-diameter portion 31a, is extended so as to be inserted into an opened front inside diameter portion of a large-diameter portion 32a of the zoom adjustment ring 32. As a result, a gap S1 is defined between the small-diameter portion 31b of the focus adjustment ring 31 and the large-diameter portion 32a of the zoom adjustment ring 32. Additionally, a gap S3 is defined between a rear end face 31a1 of the large-diameter portion 31a of the focus adjustment ring 31 and a front end face 32a1 of the large-diameter portion 32a of the zoom adjustment ring 32 as a gap S3 on the lens barrel 80. As shown in FIGS. 1 and 2, a substantially rectangular opening portion 20a1 is provided in a left front corner portion of the upper surface 20a of the case 20. The opening portion 20a1 is opened to operate the adjustment rings 30 and faces the adjustment rings 30 (the focus adjustment ring 31 and the zoom adjustment ring 32).

Figure 5:
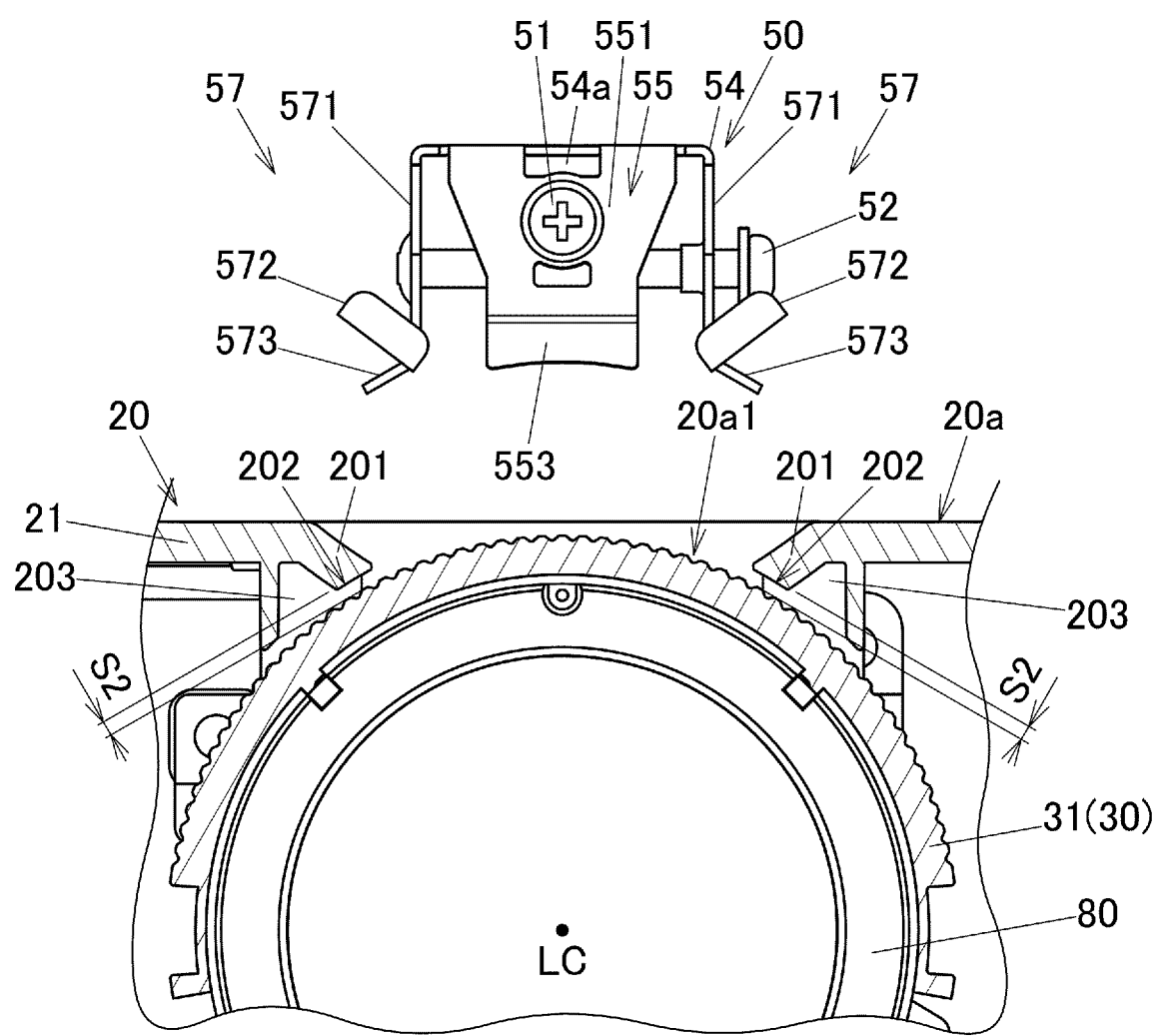
FIG. 5 is a cross-sectional view corresponding to a cross section taken along a line III-III in FIG. 2, showing a state resulting before the adjustment member fixing device according to the embodiment of the present disclosure is attached to the projector.
Figure 6:
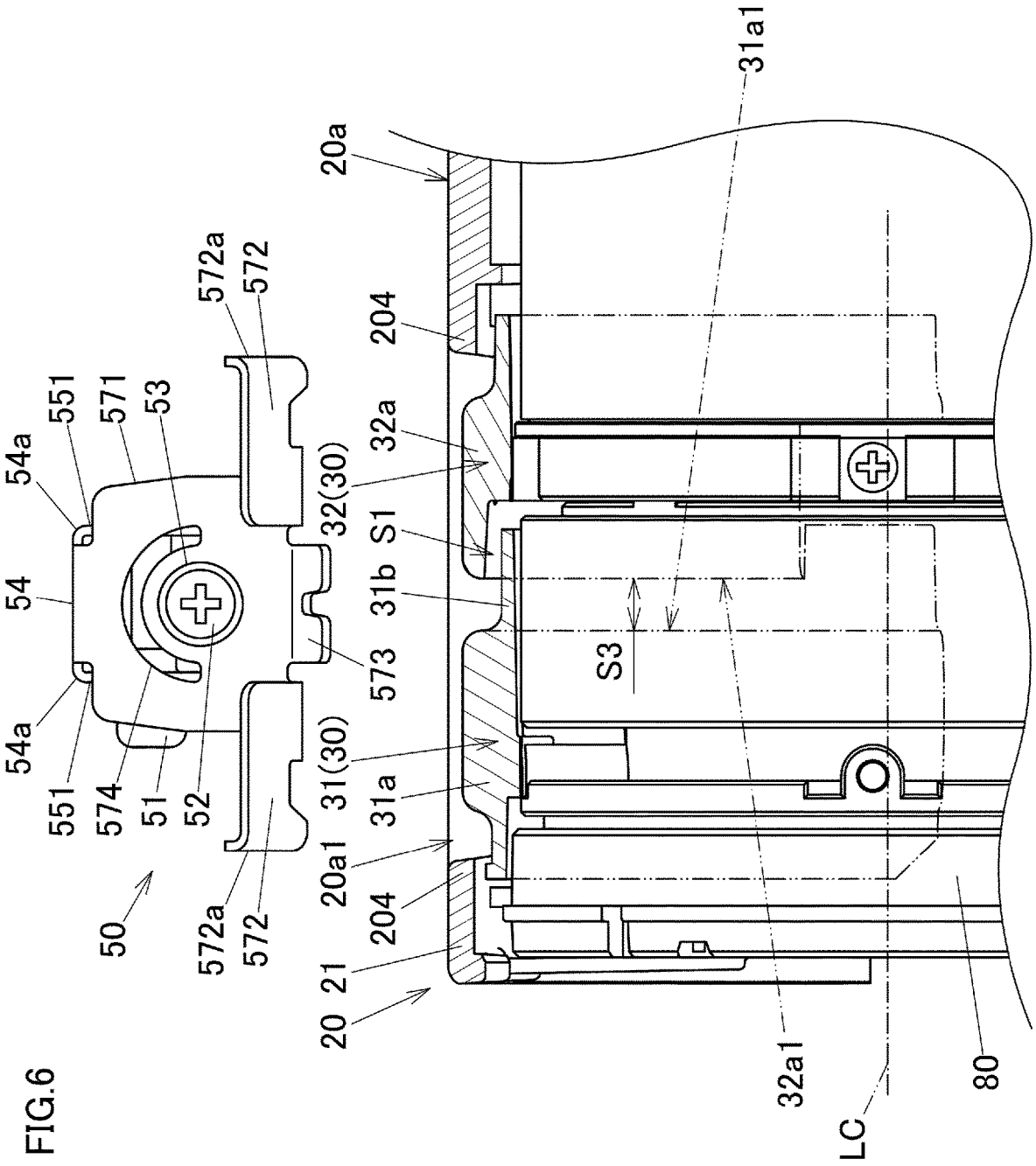
FIG. 6 is a sectional view corresponding to a section taken along a line IV-IV in FIG. 2, showing the state resulting before the adjustment member fixing device according to the embodiment of the present disclosure is attached to the projector.

As shown in FIG. 5 and the like, edge portions 201 of the opening portion 20a1, which extend in the front-rear direction while being disposed in such a manner as to face each other in the left-right direction, both slope down towards the adjustment rings 30. Distal end faces 202 of the edge portions 201 which slope downwards are each formed into a flat surface so as to define a gap S2 of 1 mm or smaller between the adjustment rings 30 and themselves. Additionally, a partition plate 203 is provided on a lower surface of a portion of the edge portion 201 which lies between the focus adjustment ring 31 and the zoom adjustment ring 32 in such a manner as to extend downwards from a lower surface of the upper case 21 with a plate surface of the partition plate 203 being oriented in such a manner as to be at right angles to the optical axis LC. As shown in FIG. 6, edge portions 204 of the opening portion 20a1, which extend in the left-right direction while being disposed in such a manner as to face each other in the front-rear direction, are both formed as a horizontal plate-shaped end face.

An adjustment member fixing device 50 is fixed to the opening portion 20a1 so as to fix the focus adjustment ring 31 and the zoom adjustment ring 32. The projector 10, in which the focus adjustment ring 31 and the zoom adjustment ring 32 are fixed so as not to rotate by the adjustment member fixing device 50, is provide in, for example, an embedded system such as a game machine or the like. In this case, a distance between a screen onto which projected light is projected and the projector 10 is set fixedly. As a result, a user does not have to execute a focus or zoom adjustment, and hence, the focus adjustment ring 31 and the zoom adjustment ring 32 are fixed by the adjustment member fixing device 50 in order to prevent the rotation and hence shifting of the focus adjustment ring 31 and the zoom adjustment ring 32 during transportation. An object of the present embodiment is to provide the adjustment member fixing device 50 and the projector 10 which can make it difficult for the optical axis of the lens barrel 80 to be shifted even though the adjustment members are fixed.

Figure 3A:
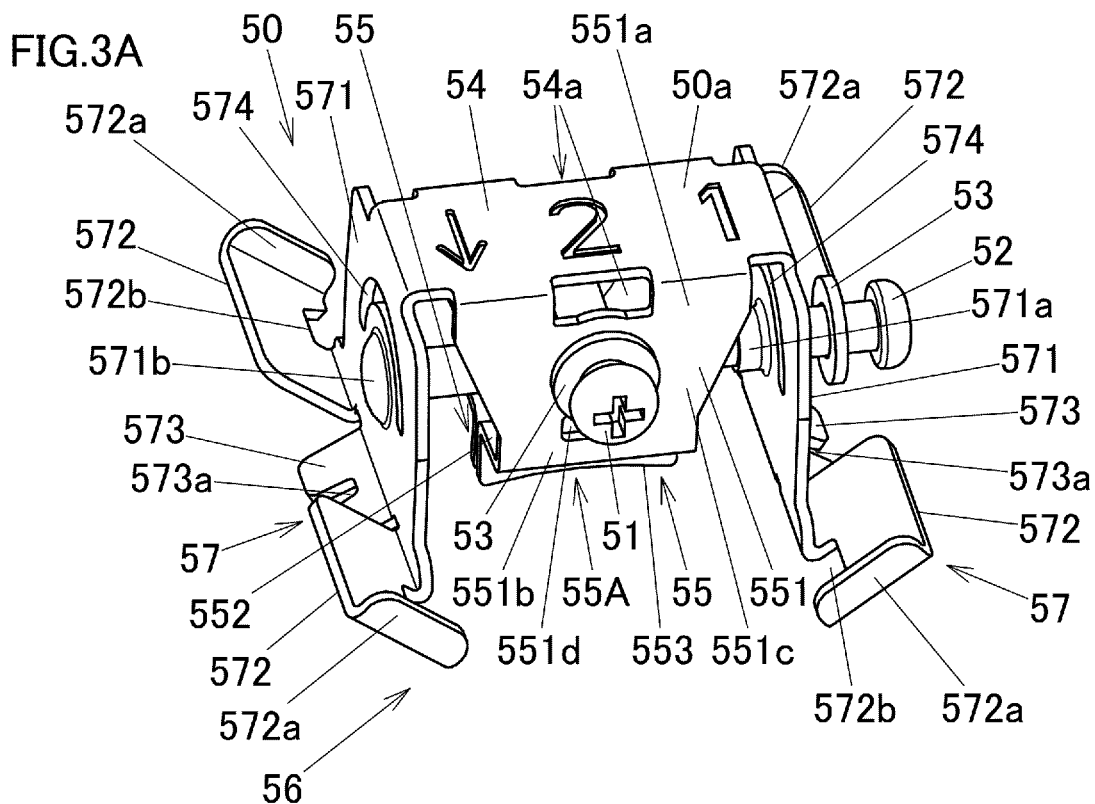
FIG. 3A is a perspective view showing the adjustment member fixing device according to the embodiment of the present disclosure as seen from a front upper side.
Figure 3B:
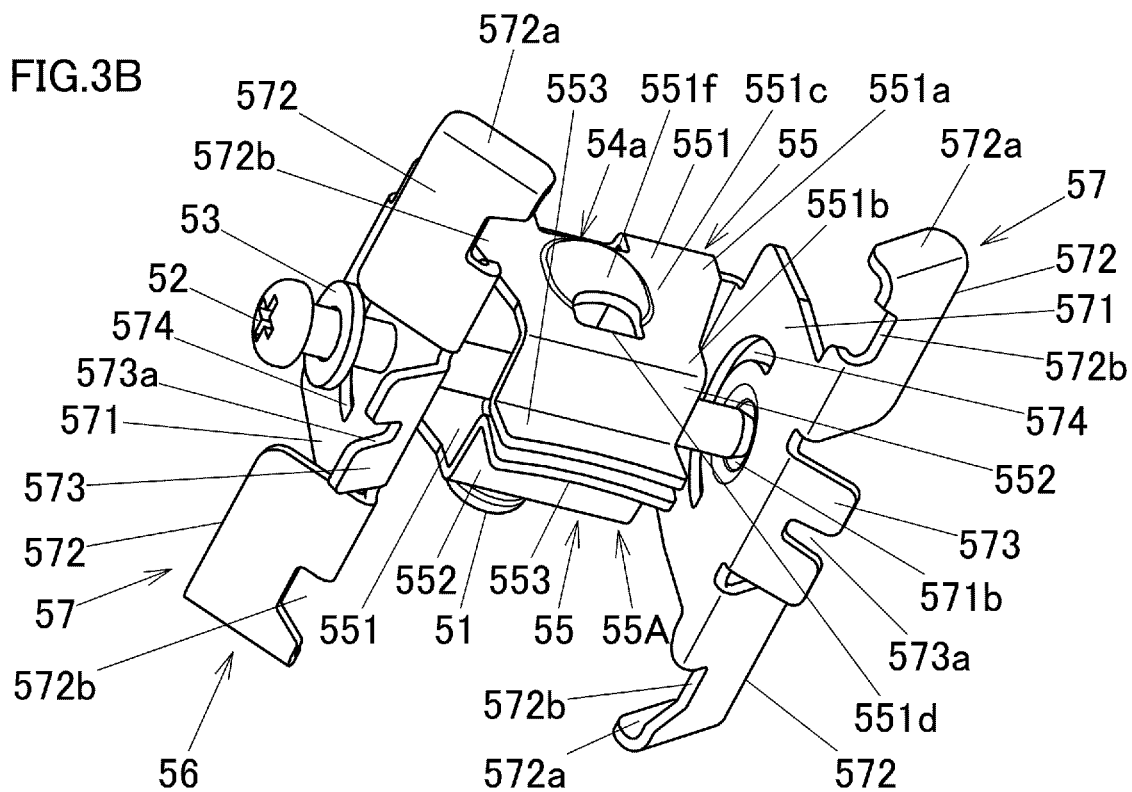
FIG. 3B is a perspective view showing the adjustment member fixing device according to the embodiment of the present disclosure as seen from a rear lower side.
Figure 4:
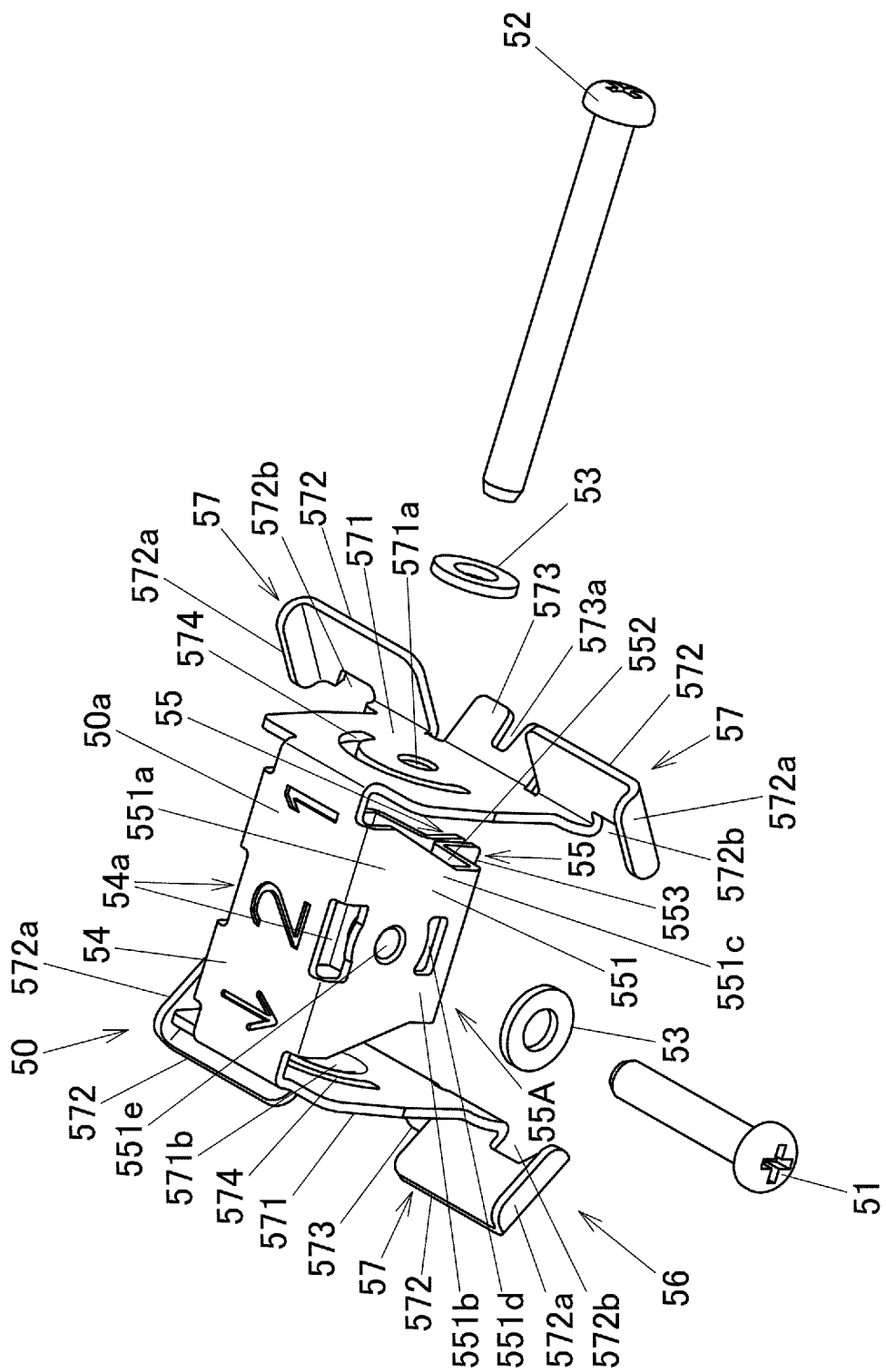
FIG. 4 is an exploded perspective view of the adjustment member fixing device according to the embodiment of the present disclosure.

The configuration of the adjustment member fixing device 50 will be described based on FIGS. 3A, 3B, and 4. The adjustment member fixing device 50 has a main body 50a formed integrally of a metal plate material, a first screw member 51 disposed on the main body 50a in such a manner as to be oriented in the front-rear direction (in other words, in the direction of the optical axis LC of the lens barrel 80 (refer to FIG. 1)) when the adjustment member fixing device 50 is attached to the projector 10, and a second screw member 52 disposed on the main body 50a in such a manner that an axial direction thereof is at right angles to the first screw member 51 as viewed from above. The first screw member 51 and the second screw member 52 are both attached to the adjustment member fixing device 50 via corresponding washers 53. An adjustment member fixing unit 55A and a main body fixing unit 56 for fixing the adjustment member fixing device 50 to the case 20 which accommodates the lens barrel 80 are provided on the main body 50a of the adjustment member fixing device 50. Then, the adjustment member fixing unit 55A includes a pair of adjustment member fixing portions 55, and the main body fixing unit 56 includes a pair of engagement portions 57.

The main body portion 50a includes an upper plate 54 of a substantially rectangular plate-like shape which is long in the left-right direction. The upper plate 54 is disposed in such a manner that short sides are oriented substantially parallel to the optical axis LC. Numerical figures indicating a screw tightening order ("1" for the second screw member 52, "2" for the first screw member 51) and an arrow indicating a front side are marked on the upper plate 54. A head portion of the first screw member 51 and a head portion of the second screw member 52 are placed, respectively, on a side wall and a short side (a left side and a front side) of the projector 10 by attaching the adjustment member fixing device 50 to the projector 10 as indicated by these marks, as a result of which the first screw member 51 and the second screw member 52 can easily be operated to be turned. The upper plate 54 is provided with its plate surfaces oriented in an up-down direction. The pair of adjustment member fixing portions 55 of the main body 50a are both caused to extend downwards from respective edges of long sides of the upper plate 54. On the other hand, the pair of engagement portions 57 of the main body fixing unit 56 of the main body 50a are both caused to extend downwards from respective edges of short sides of the upper plate 54.

The pair of adjustment member fixing portions 55 each include a substantially trapezoidal connection plate 551 which connects to the long side of the upper plate 54 at an upper end thereof in such a manner as to be at substantially right angles to the upper plate 54. Additionally, the adjustment member fixing portions 55 each include a substantially rectangular horizontal plate portion 552 which is long in the left-right direction, and this substantially rectangular horizontal plate portion 552 is disposed so that the horizontal plate portion 552 connects to a lower end of the corresponding connection plate 551 in such a manner as to be at substantially right angles to the connection plate 551 and extends towards the other connection plate 551 which the horizontal plate portion 552 faces substantially horizontally with its plate surfaces oriented in the up-down direction. Then, the adjustment member fixing portions 55 each include a substantially rectangular insertion claw portion 553 which is long in the left-right direction, and this substantially rectangular insertion claw portion 553 connects to an edge portion of the horizontal plate portion 552 which lies opposite to the connecting portion where the horizontal plate portion 552 connects to the connection plate 551 in such a manner as to be at substantially right angles to the horizontal plate portion 552 and extends downwards. A lower long side of the insertion claw portion 553 is formed into a substantially concaved arc shape which follows an outer circumferential surface of the small-diameter portion 31b of the focus adjustment ring 31.

The connection plate 551 has a first width-identical plate portion 551a having a width identical to that of the upper plate 54 and connecting to the upper plate 54 and a second width-identical plate portion 551b formed to be narrower in width than the first width-identical plate portion 551a to connect to the horizontal plate portion 552. A width-transition plate portion 551c, whose width is gradually reduced as it extends downwards, is formed between the first width-identical plate portion 551a and the second width-identical plate portion 551b. A substantially rectangular hole portion 54a is formed substantially in a transverse center of a portion where the first width-identical plate portion 551a of the connection plate 551 connects to the upper plate 54. Additionally, a substantially rectangular hole portion 551d is formed substantially in a transverse center of a portion where the width-transition plate portion 551c of the connection plate 551 connects to the second width-identical plate portion 551b. The adjustment member fixing portion 55, which is formed into a plate-like shape, is resilient and is made more resilient by the hole portions 54a, 551d.

A first internal thread portion 551e is provided in one (specifically, a front one) of the pair of adjustment member fixing portions 55 so that the first screw member 51 screws thereinto. Specifically, the first internal thread portion 551e is formed by applying burring work to a front surface of the width-transition plate portion 551c of one (the front) connection plate 551 and tapping an inside diameter portion formed by the burring work so applied. In addition, a first receiving portion 551f is provided on the other (specifically, a rear one) of the pair of adjustment member fixing portions 55 so that a distal end portion of the first screw member 51 is brought into abutment therewith. Specifically, the first receiving portion 551f is formed by concavely depressing an inner surface (a front surface) of the width-transition plate portion 551c of the other (the rear) connection plate 551.

With the pair of adjustment member fixing portions 55 configured as has been described heretofore, when the first screw member 51 is tightened, the adjustment member fixing portions 55 move away from each other so as to increase a space defined therebetween against the resilient or spring-back force thereof. When the first screw member 51 is turned to be loosened, the pair of adjustment member fixing portions 55 move towards each other so as to reduce the space defined therebetween. In this way, the pair of adjustment member fixing portions 55 are caused to move towards and away from the end faces (the rear end face 31a1, the front end face 32a1) of the adjustment rings 30 by the first screw member 51.

The pair of engagement portions 57 each include a substantially trapezoidal connection plate 571 which connects to the short side of the upper plate 54 at substantially right angles. The connection plate 571 is formed wider than the short side of the upper plate 54. The connection plate 571 becomes resilient at the connecting portion where the connection plate 571 connects to the upper plate 54.

A first abutment portion 572 of a plate-like shape is provided individually at front and rear sides of a lower end of the connection plate 571 in such a manner as to project outwards in the left-right direction (an axial direction of the second screw member 52). That is, four first abutment portions 572 are provided at four, that is, front, rear, left, and right corner portions of the adjustment member fixing device 50. The first abutment portion 572 is formed in such a manner as to project more than a width (in the front-rear direction) of the connection plate 571 and is provided in such a manner as to be inclined upwards so as to form an acute angle between a plate surface of the connection plate 571 and itself. Then, a restriction abutment portion 572a is formed at an outer end in the front-rear direction of the first abutment portion 572 (a front end of the front first abutment portion 572, a rear end of the rear first abutment portion 572) in such a manner as to be bent upwardly at substantially right angles. A cut-out portion 572b is formed in an edge portion of the first abutment portion 572 which faces the connection plate 571 in such a manner as to be cut out concavely.

A second abutment portion 573 of a plate-like shape is provided between the pair of front and rear first abutment portions 572 which are disposed in the front-rear direction. The second abutment portion 573 is provided in such a manner as to be inclined downwards with respect to the connection plate 571. A notched portion 573a is provided in the second abutment portion 573 at a center thereof.

Additionally, the pair of engagement portions 57 connect to the short sides of the upper plate 54 as described above. As a result, the pair of engagement portions 57 (the connection plates 571) each become resilient. A second internal thread portion 571a is provided in the connection plate 571 of one (a left) engagement portion 57 of the pair of engagement portions 57 so that the second screw member 52 screws thereinto. Specifically, the second internal thread portion 571a is formed by applying burring work to an outer surface of the connection plate 571 of one (the left) engagement portion 57 towards an inner surface thereof and tapping the portion to which the burring work is so applied. On the other hand, a second receiving portion 571b is provided on the connection plate 571 of the other (a right) engagement portion 57 of the pair of engagement portions 57 so that a distal end portion of the second screw member 52 is brought into abutment therewith. Specifically, the second receiving portion 571b is formed by concavely depressing an inner surface of the other (the rear) connection plate 571. Additionally, an arc-shaped hole portion 574 is formed individually in positions lying near to upper sides of the second internal thread portion 571a and the second receiving portion 571b on the connection plates 571. The arc-shaped hole portions 574 provide resiliency to the portions where the second internal thread portion 571a and the second receiving portion 571b are provided.

With the pair of engagement portions 57 configured as described above, when the second screw member 52 is tightened, a space defined between the pair of engagement portions 57 is expanded against the resilient or spring-back force of the engagement portions 57. Then, when the second screw member 52 is turned to be loosened, the space defined between the pair of engagement portions 57 is narrowed. In other words, the pair of engagement portions 57 are formed so as to move towards and away from the facing edge portions 201 of the opening portion 20a1.

Figure 7A:
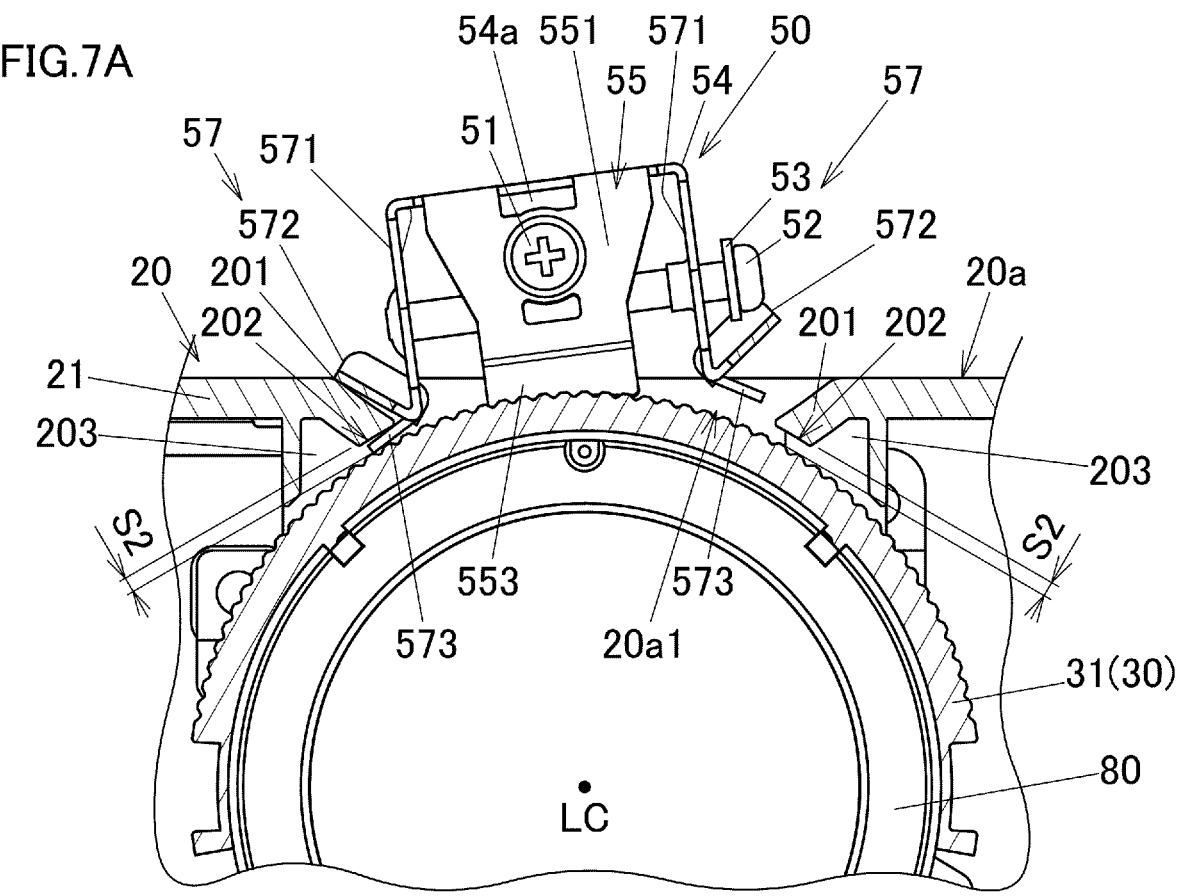
FIG. 7A is a cross-sectional view corresponding to the section taken along the line III-III in FIG. 2, showing a way in which the adjustment member fixing device according to the embodiment of the present disclosure is being attached to the projector, or more particularly, a state in which one of second abutment portions of a pair of engagement portions is inserted into a gap S2.

Next, referring to FIGS. 5 to 10, a fixing method of the adjustment rings 30 by the adjustment member fixing device 50 will be described. Firstly, the pair of adjustment member fixing portions 55 and the pair of engagement portions 57 of the adjustment member fixing device 50 are put in a state in which no resilient or spring-back force is generated therein (a state shown in FIGS. 3A, 3B). A distance defined then between outer edge portions of the insertion claw portions 553 of the pair of adjustment member fixing portions 55 is defined as D1 (refer to FIG. 8), and a distance defined then between the connection plates 571 of the pair of engagement portions 57 is defined as W1 (refer to FIG. 7B). Next, as shown in FIGS. 5, 6, the adjustment member fixing device 50 is disposed in the opening portion 20a1 of the projector 10 by referring to the marks on the upper plate 54 of the adjustment member fixing device 50 in such a manner that the head portion of the first screw member 51 is positioned to face the front, and the head portion of the second screw member 52 is positioned to face the left, whereby a state shown in FIG. 7A is provided. Then, a distal end portion of the second abutment portion 573 of one of the pair of engagement portions 57 of the adjustment member fixing device 50 is caused to slide into the gap S2.

Figure 7B:
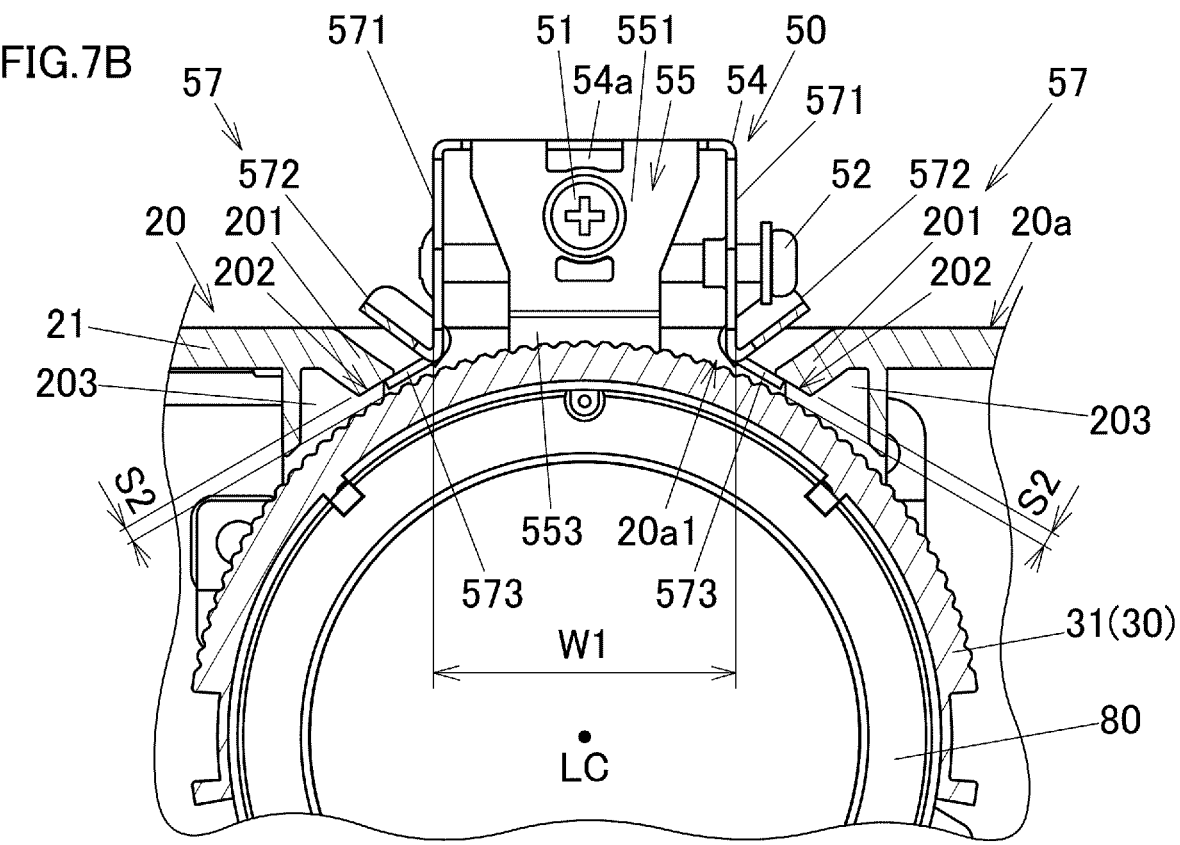
FIG. 7B is a cross-sectional view corresponding to the section taken along the line III-III in FIG. 2, showing the way in which the adjustment member fixing device according to the embodiment of the present disclosure is being attached to the projector, or more particularly, a state resulting before a second screw member is tightened.

Here, as shown in FIG. 8, a space defined between the front and rear restriction abutment portions 572a of the first abutment portions 572 substantially coincides with a length in the front-rear direction of the opening portion 20a1 (a distance between the edge portions 204). As a result, the adjustment member fixing device 50 can easily be positioned as a result of the restriction abutment portions 572a being guided by the front and rear edge portions 204 of the opening portion 20a1. Additionally, as this occurs, the partition plates 203 formed on the lower surfaces of the edge portions 201 are positioned in the notched portions 573a of the second abutment portions 573, whereby the adjustment member fixing device 50 is positioned accordingly (also refer to FIG. 2). In this way, as shown in FIG. 7B, the adjustment member fixing device 50 is disposed in the position where the distal end portions of both the second abutment portions 573 of the pair of engagement portions 57 slide into the corresponding gaps S2.

Additionally, as this occurs, as shown in FIG. 8, the pair of insertion claw portions 553 of the pair of adjustment member fixing portions 55 of the adjustment member fixing device 50 are positioned on the outer circumference of the small-diameter portion 31b of the focus adjustment ring 31 and in the gap S3 defined between the large-diameter portion 31a of the focus adjustment ring 31 and the large-diameter portion 32a of the zoom adjustment ring 32. In this way, the adjustment member fixing unit 55A is provided so as to be inserted between the focus adjustment ring 31 and the zoom adjustment ring 32 in a first state in which the insertion claw portions 553 of the pair of adjustment member fixing portions 55 of the adjustment member fixing unit 55A stay the width D1 which is smaller than the gap S3 apart from each other in order to be inserted into the gap S3. Then, when the second screw member 52 is first tightened by following the numerical figures marked on the upper plate 54 of the adjustment member fixing device 50, the pair of engagement portions 57 move away from each other so as to expand the space therebetween, whereby the distance or width defined between the connection plates 571 increases from W1 (the state shown in FIG. 7B) to W2 (a state shown in FIG. 9) (W1<W2). As this occurs, lower surfaces of the first abutment portions 572 are brought into abutment with upper surfaces of the edge portions 201, and upper surfaces of the second abutment portions 573 are brought into abutment with the distal end faces 202 of the edge portions 201. In this way, the adjustment member fixing device 50 is fixed in place in the opening portion 20a1 in the case 20 by the pair of engagement portions 57 of the main body fixing unit 56. In other words, the adjustment member fixing device 50 is fixed to the lens barrel 80 by the pair of engagement portions 57 of the main body fixing unit 56.

Next, when the first screw member 51 is tightened by following the numerical figures marked on the upper plate 54 of the adjustment member fixing device 50, the pair of adjustment member fixing portions 55 move away from each other so as to expand the space or width defined therebetween, whereby the distance between the outer edge portions of the insertion claw portions 553 increases from D1 (the state shown in FIG. 8) to D2 (a state shown in FIG. 10) (D1<D2). That is, the insertion claw portions 553 of the adjustment member fixing unit 55A (the pair of adjustment member fixing portions 55) are put in a second state in which the insertion claw portions 553 stay the width D2 which is substantially identical to the gap S3 apart from each other in order to fix the adjustment rings 30. In one example, the width D2 in the second state is identical to the gap S3. When referred to in the present disclosure, the identical width includes a width which can provide an advantageous effect identical to one provided in the case that the width D2 is identical to the gap S3. Of the insertion claw portions 553 of the pair of adjustment member fixing portions 55, the insertion claw portion 553 which faces the focus adjustment ring 31 presses the rear end face 31a1 of the large-diameter portion 31a of the focus adjustment ring 31 which faces the insertion claw portion 553 to the front in the direction of the optical axis LC. On the other hand, the insertion claw portion 553 which faces the zoom adjustment ring 32 presses the front end face 32a1 of the large-diameter portion 32a of the zoom adjustment ring 32 which faces the insertion claw portion 553 to the rear in the direction of the optical axis LC. In this way, the pair of adjustment member fixing portions 55 are each provided so as to press the adjustment rings 30 in the direction of the optical axis LC. Then, the insertion claw portion 553 of the adjustment member fixing portion 55 which presses the front end face 32a1 of the large-diameter portion 32a of the zoom adjustment ring 32 is brought into engagement in such a manner as to slide into the gap S1 due to the insertion claw portion 553 being resilient as a result of the insertion claw portion 553 being formed into the plate-like shape. On the other hand, the insertion claw portion 553 of the adjustment member fixing portion 55 which presses the rear end face 31a1 of the large-diameter portion 31a of the focus adjustment ring 31 is similarly brought into engagement in such a manner as to bite into the rear end face 31a1. In this way, the adjustment rings 30 are pressed in the direction of the optical axis LC to thereby be restricted from rotating and fixed in place by the adjustment member fixing device 50. Another object of the present embodiment is to provide an adjustment member fixing method which makes it difficult for the optical axis of the lens barrel 80 to be shifted even in the case that the adjustment member is fixed.

That is, an adjustment member (the adjustment rings 30) fixing method has the following steps.

Preparation Step: The width defined between the insertion claw portions 553 of the adjustment member fixing portions 55 is set to D1 (the first state), while the width defined between the pair of engagement portions 57 is set to W1 (FIGS. 5, 6).

Adjustment Member Fixing Portions Insertion Step (First Step): The distal end portion of the second abutment portion 573 of one engagement portion 57 is caused to slide into the gap S2 (FIG. 7A), whereafter the other engagement portion 57 is also inserted into the gap S2, whereby the adjustment member fixing portions 55 are positioned so that the distal end portions of both the second abutment portions 573 are caused to slide into the corresponding gaps S2 (FIG. 7B), and then, the insertion claw portions 553 of the adjustment member fixing portions 55 are inserted into the gap S3 on the lens barrel 80 (FIG. 8).

Figure 9:
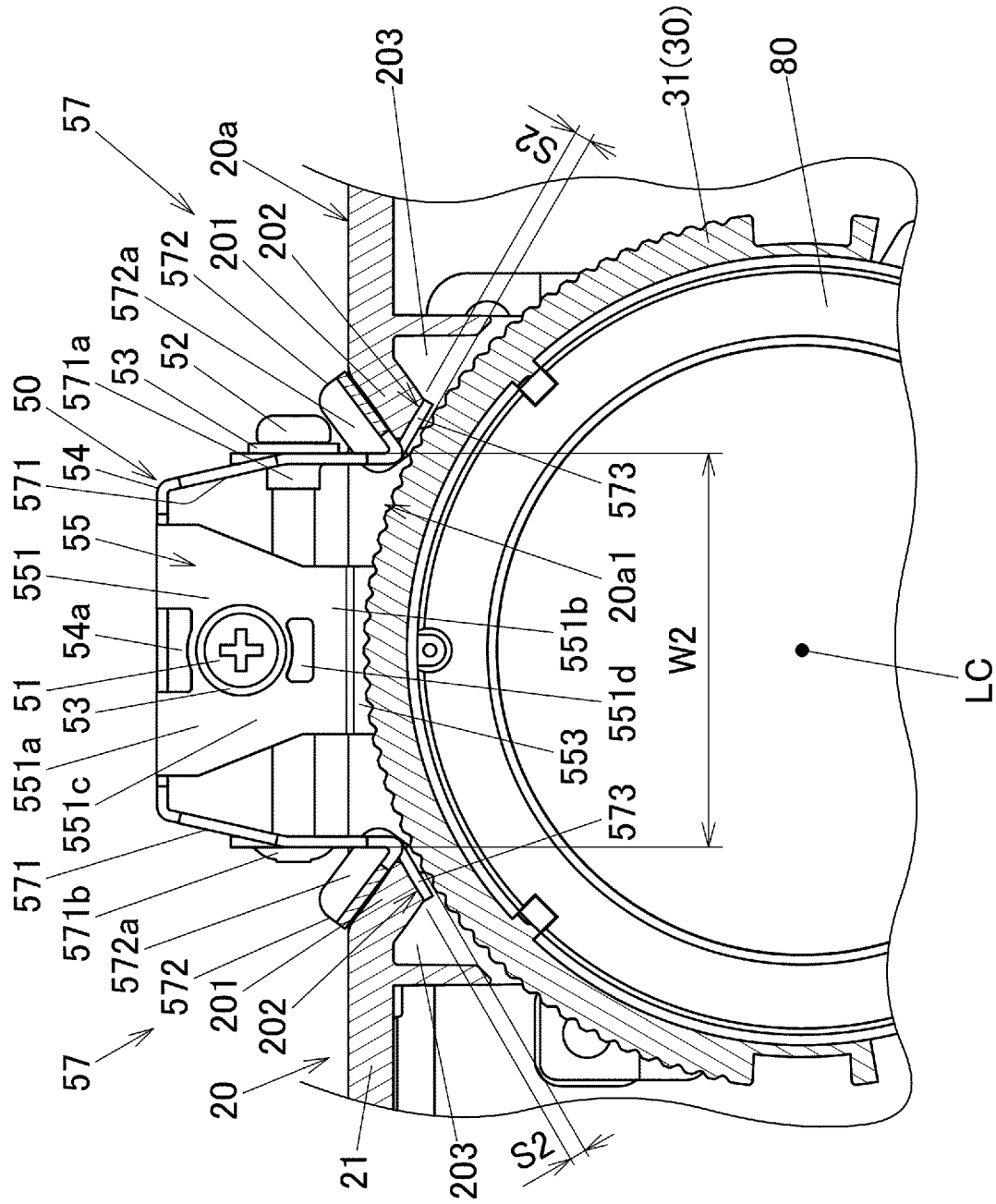
FIG. 9 is a cross-sectional view, corresponding to the section taken along the line III-III in FIG. 2, of the projector to which the adjustment member fixing device according to the embodiment of the present disclosure is attached.

Main Body Fixing Step: The second screw member 52 is tightened, so that the pair of engagement portions 57 stay the width W2 apart from each other, and the adjustment member fixing device 50 is fixed in place in the opening portion 20a1 (the lens barrel 80 in the case 20) (FIG. 9).

Figure 10:
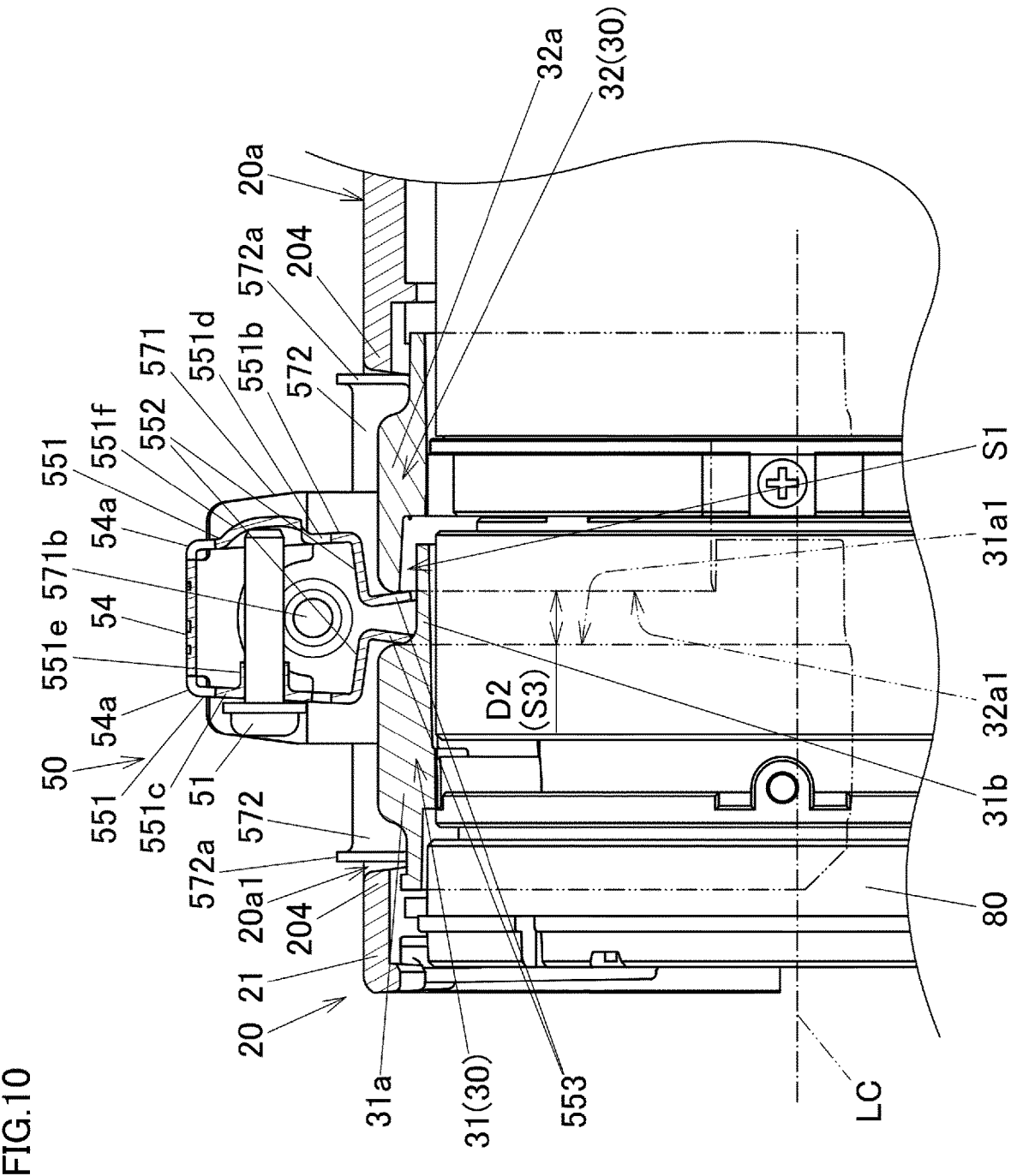
FIG. 10 is a sectional view, corresponding to the section taken along the line IV-IV in FIG. 2, which shows the adjustment member fixing device according to the embodiment of the present disclosure, an adjustment ring, and an upper case in section.

Adjustment Member Fixing Step (Second Step): The first screw member 51 is tightened so as to change the width defined between the insertion claw portions 553 of the adjustment member fixing portions 55 from D1 to D2 (the second state), making the width defined between the inser-tion claw portions 553 substantially identical to the gap S3 defined between the adjustment rings 30 of the lens barrel 80 (FIG. 10). In one example, the width D2 between the claw portions 553 may be substantially identical to the gap S3. Then, in the case that the adjustment member fixing unit 55A is in the second state, the adjustment rings 30 are pressed in the direction of the optical axis LC by the insertion claw portions 553 of the adjustment member fixing portions 55.

When the first screw member 51 is loosened, the insertion claw portions 553 of the pair of adjustment member fixing portions 55 move towards each other and return to the state shown in FIG. 8, whereby the fixing of the adjustment rings 30 by the pair of adjustment member fixing portions 55 is released. At this time, the adjustment member fixing device 50 is held fixed in place in the opening portion 20a1 in the case 20 by the main body fixing unit 56 (the pair of engagement portions 57). As a result, the operator can execute a focus adjustment and a zoom adjustment by rotating the adjustment rings 30 with the fingers of the hand with the adjustment member fixing device 50 held fixed to the case 20.

With the embodiment that has been described heretofore, the adjustment member fixing device 50 has the adjustment member fixing unit 55A having the first state in which the width of the adjustment member fixing unit 55A is set to the width D1 which is smaller than the gap S3 so that the adjustment member fixing unit 55A is inserted into the gap S3 on the lens barrel 80 and the second state in which the width of the adjustment member fixing unit 55A is set to the width D2 which is substantially identical (identical) to the gap S3 so that the adjustment member fixing unit 55A fixes the movable adjustment rings 30 which are provided on the lens barrel 80. As a result, since the lens barrel 80 is prevented from being pressed in the direction which is at right angles to the optical axis LC in fixing the adjustment rings 30, even though the adjustment rings 30 are fixed by the adjustment member fixing device 50, a risk of the optical axis LC of the lens barrel 80 being shifted can be reduced. In the present embodiment, while the adjustment members (the focus adjustment ring 31, the zoom adjustment ring 32) are formed into the semi-circular arc shape, the present invention is not limited thereto, and hence, various forms of adjustment members such as a lever or the like can be adopted.

Additionally, the adjustment member fixing unit 55A has the first screw member 51 and the first receiving portion 551f with which the distal end portion of the first screw portion 51 is brought into abutment. As a result, the adjustment rings 30 can be fixed with the simple configuration in which the first internal thread portion 551e is formed on one side, while only the first screw member 51 is brought into abutment with the other side and with the simple operation in which the screw member is only rotated.

The adjustment member fixing device 50 includes the main body fixing unit 56 for fixing the adjustment member fixing device 50 to the case 20 which accommodates the lens barrel 80. As a result, the adjustment member fixing device 50 is prevented from being shifted with respect to the lens barrel 80, and hence, a risk of the adjustment rings 30 being shifted is reduced even during transportation. In the present embodiment, while the adjustment member fixing device 50 is described as being fixed to the lens barrel 80 by the pair of engagement portions 57, the present invention is not limited thereto, and hence, the adjustment member fixing device 50 can also be so fixed with other configurations.

The main body fixing unit 56 has the second internal thread portion 571*a* into which the second screw member 52 screws and the second receiving portion 571*b* with which the distal end portion of the second screw member 51 is brought into abutment. As a result, the adjustment member fixing device 50 can be fixed to the lens barrel 80 with the simple configuration in which the second internal thread portion 571*a* is formed on one side, while only the second screw member 52 is brought into abutment with the other side and with the simple operation in which the screw member is only rotated.

The second screw member 52 is disposed in the position where the second screw member 52 is at right angles to the first screw member 51 when viewed from above. As a result, the attaching operation of attaching the adjustment member fixing device 50 to the case 20 and the fixing operation of fixing the adjustment rings 30 by the adjustment member fixing device 50 can be executed instinctively and simply.

The adjustment member fixing portions 50 can be pressed in the direction of the optical axis LC in order to fix the adjustment rings 30 (the focus adjustment ring 31 and the zoom adjustment ring 32). As a result, the lens barrel 80 is not pressed in the direction which is at right angles to the optical axis LC in any case in fixing the adjustment rings 30, and hence, a risk of the optical axis LC of the lens barrel 80 being shifted can be reduced even though the adjustment rings 30 are fixed by the adjustment member fixing device 50. In the present embodiment, while the adjustment members (the focus adjustment ring 31, the zoom adjustment ring 32) are formed into the semi-circular arc shape, the present invention is not limited thereto, and hence, various forms of adjustment members such as a lever or the like can be adopted.

The insertion claw portions 553 of the adjustment member fixing portions 55 of the adjustment member fixing device 50 are brought into abutment with the end faces (the rear end face 31*a*1, the front end face 32*a*1) of the adjustment rings 30 which are provided as the semi-circular arc-shaped rings. As a result, the adjustment rings 30 can be pressed in the direction of the optical axis LC with the simple configuration.

The insertion claw portions 553 of the adjustment member fixing portions 55 are provided so as to be caused to move towards and away from the adjustment rings 30 by the first screw member 51. As a result, the fixing and releasing of the adjustment rings 30 can be switched over by the simple operation of turning the screw member only.

The adjustment member fixing portions 55 each have the resiliency. As a result, the adjustment member fixing portions 55 can press the adjustment rings 30 in the direction of the optical axis LC in a more ensured fashion.

Additionally, the adjustment member fixing device 50 is fixed to the case 20 which accommodates the lens barrel 80 by the main body fixing unit 56. As a result, even though the adjustment rings 30 are pressed by the adjustment member fixing device 50, a risk of, for example, the insertion claw portions 553 being shifted or the like can be reduced. In the present embodiment, while the adjustment member fixing device 50 is fixed to the case 20 by the pair of engagement portions 57, the present invention is not limited thereto, and hence, the adjustment member fixing device 50 can also be so fixed using other configurations.

The main body fixing unit 56 has the pair of engagement portions 57 for fixing the adjustment member fixing device 50 in place in the opening portion 20*a*1 in the case 20 which is opened for operating the adjustment rings 30 using the second screw member 52. As a result, not only can the configuration of the main body fixing unit 56 be made so simple that the adjustment member fixing device 50 is fixed by making use of the opening portion 20*a*1, but also the adjustment member fixing device 50 can be fixed to the lens barrel 80 in an ensured fashion.

The adjustment member fixing portions 55 press the adjustment rings 30 in the direction of the optical axis LC in the case that in the second state. As a result, the adjustment rings 30 can be fixed in a more ensured fashion by disposing the adjustment member fixing portions 55 in the position where the adjustment member fixing portions 55 can fix the adjustment rings 30 in an ensured fashion.

Since the adjustment rings 30 can be fixed without shifting the optical axis LC of the lens barrel 80 by fixing the adjustment rings 30 of the projector 10 by the adjustment member fixing device 50, the projector 10 can be provided in which a clear image can be projected while fixing the adjustment rings 30.

In addition, the adjustment member fixing method has the first step of inserting the adjustment member fixing portions 55 of the adjustment member fixing device 50 into the gap S3 on the lens barrel 80 in the case that the adjustment member fixing portions 55 are in the first state in which the adjustment member fixing portions 55 stay the width D1 which is smaller than the gap S3 apart from each other and the second step of putting the adjustment member fixing portions 55 in the second state in which the adjustment member fixing portions 55 stay the substantially identical width (the identical width) to the gap S3 apart from each other. As a result, the adjustment member fixing method can be provided which can reduce the risk of the optical axis LC of the lens barrel 80 being shifted. Then, the fixing of the adjustment rings 30 can be released for adjustment in such a state that the adjustment member fixing device 50 is fixed to the projector 10 by incorporating a step of fixing the adjustment member fixing device 50 to the case 20 on the side of the lens barrel 80 (that is, the projector 10) using the main body fixing unit 56 between the first step and the second step.

The embodiment that has been described heretofore is presented as an example, and hence, there is no intention to limit the scope of the present invention by the embodiment. The novel embodiment can be carried out in other various forms, and various omissions, replacements, and modifications can be made thereto without departing from the spirit and scope the invention. These embodiments and their variations are included in the spirit and scope of the invention and are also included in scopes of inventions set forth under claims and their equivalents.

What is claimed is:

1. An adjustment member fixing device for a movable adjustment member of a lens barrel having a gap associated therewith, the adjustment member fixing device comprising:
    an adjustment member fixing unit having a first state in which the adjustment member fixing unit has a width smaller than the gap so as to be inserted into the gap and a second state in which the adjustment member fixing unit has a width sized so that the adjustment member fixing unit engages the movable adjustment member so as to fix the movable adjustment member against movement.

2. The adjustment member fixing device according to claim 1,
    wherein the adjustment member fixing unit comprises:
    a first internal thread portion into which a first screw member is threaded; and a first receiving portion with which a distal end portion of the first screw member is brought into abutment.

3. The adjustment member fixing device according to claim 2, comprising:
a main body fixing unit configured to fix the adjustment member fixing unit to a case side where the lens barrel is accommodated.

4. The adjustment member fixing device according to claim 3,
wherein the main body fixing unit comprises:
a second internal thread portion into which a second screw member is threaded; and
a second receiving portion with which a distal end portion of the second screw member is brought into abutment.

5. The adjustment member fixing device according to claim 4,
wherein the second screw member is disposed in a position where the second screw member is at right angles to the first screw member as viewed from above.

6. The adjustment member fixing device according to claim 1,
wherein the adjustment member fixing unit can be pressed in an optical axis direction of the lens barrel to fix the adjustment member.

7. The adjustment member fixing device according to claim 6,
wherein the adjustment member fixing unit is brought into abutment with an end face of the adjustment member, the adjustment member having a ring-like shape.

8. The adjustment member fixing device according to claim 7,
wherein the adjustment member fixing unit is provided in such a manner as to be caused to move towards and away from the end face of the adjustment member by the first screw member.

9. The adjustment member fixing device according to claim 1,
wherein the adjustment member fixing unit has resiliency.

10. The adjustment member fixing device according to claim 6,
wherein the adjustment member fixing unit has resiliency.

11. The adjustment member fixing device according to claim 6,
wherein the adjustment member fixing unit is fixed to a case where the lens barrel is accommodated by a main body fixing unit.

12. The adjustment member fixing device according to claim 11,
wherein the adjustment member fixing unit comprises a pair of engagement portions configured to fix the adjustment member fixing unit in place in an opening portion of the case to operate the adjustment member using a second screw member.

13. The adjustment member fixing device according to claim 6,
wherein the adjustment member fixing unit presses the adjustment member in the optical axis direction when the adjustment fixing unit is in the second state.

14. A projector, comprising:
the adjustment member fixing device according to claim 1 the projector further including the lens barrel and the movable adjustment member wherein the movable adjustment member comprises a pair of movable adjustment members with the gap being between the pair of movable adjustment members and the adjustment member fixing device being attached to the projector.

15. A projector, comprising:
the adjustment member fixing device according to claim 6 with the adjustment member fixing device being attached to the projector.

16. A method of fixing a movable adjustment member for a lens barrel having a gap associated therewith, the method comprising:
inserting an adjustment member fixing unit of an adjustment member fixing device into the gap in a first state in which the adjustment member fixing unit has a width smaller than the gap; and
shifting the adjustment member fixing unit from the first state to a second state in which the adjustment member fixing unit has a width gap sized so that the adjustment member fixing unit engages the movable adjustment member in order to fix the adjustment member against movement.

17. The method according to claim 16, comprising:
fixing the adjustment member fixing device to a case for the lens barrel, which occurs between the inserting of the adjustment member fixing unit of the adjustment member fixing device in the first state and the shifting of the adjustment member fixing unit in the second state.

* * * * *